(12) United States Patent
Yokoyama et al.

(10) Patent No.: US 7,404,919 B2
(45) Date of Patent: Jul. 29, 2008

(54) FLEXIBLE MOLD AND METHOD OF MANUFACTURING MICROSTRUCTURE USING THE SAME

(75) Inventors: Chikafumi Yokoyama, Zama (JP); Akira Yoda, Machida (JP); Hiroshi Kikuchi, Yamato (JP)

(73) Assignee: 3M Innovative Properties Company, St. Paul, MN (US)

( * ) Notice: Subject to any disclaimer, the term of this patent is extended or adjusted under 35 U.S.C. 154(b) by 194 days.

(21) Appl. No.: 10/517,644

(22) PCT Filed: Jun. 10, 2003

(86) PCT No.: PCT/US03/18232

§ 371 (c)(1),
(2), (4) Date: Dec. 9, 2004

(87) PCT Pub. No.: WO2004/007166

PCT Pub. Date: Jan. 22, 2004

(65) Prior Publication Data

US 2005/0253290 A1  Nov. 17, 2005

(30) Foreign Application Priority Data

Jul. 10, 2002 (JP) ............................ 2002-201539

(51) Int. Cl.
- *B29C 41/22* (2006.01)
- *B29C 35/08* (2006.01)
- *B29C 59/16* (2006.01)
- *B29C 33/38* (2006.01)

(52) U.S. Cl. ...................... 264/225; 264/227; 264/259; 156/275.5

(58) Field of Classification Search ............... 264/1.1, 264/496, 224, 225, 226, 227, 259, 260; 977/887; 156/275.5

See application file for complete search history.

(56) References Cited

U.S. PATENT DOCUMENTS

| | | | | |
|---|---|---|---|---|
| 2,859,088 A | * | 11/1958 | Erdle et al. | 264/18 |
| 3,369,949 A | * | 2/1968 | Forrest | 156/232 |
| 4,929,403 A | * | 5/1990 | Audsley | 264/446 |
| 5,453,450 A | * | 9/1995 | Kinzer et al. | 522/18 |
| 5,462,702 A | | 10/1995 | Slaughter, Jr. | |
| 5,992,320 A | * | 11/1999 | Kosaka et al. | 101/401.1 |
| 6,247,986 B1 | | 6/2001 | Chiu et al. | |
| 6,251,208 B1 | | 6/2001 | Serizawa et al. | |
| 6,306,948 B1 | * | 10/2001 | Yokoyama et al. | 524/492 |
| 6,373,191 B1 | * | 4/2002 | Jang et al. | 313/582 |

(Continued)

FOREIGN PATENT DOCUMENTS

JP    2001/058352    3/2001

(Continued)

*Primary Examiner*—Matthew J. Daniels
(74) *Attorney, Agent, or Firm*—Carolyn A. Fischer

(57) ABSTRACT

To provide a flexible mold (10) useful for manufacturing a PDP rib having a lattice pattern and other microstructures, and capable of highly precisely manufacturing the microstructures without involving defects such as occurrence of bubbles and pattern deformation. A flexible mold (10) comprises a base layer (2) made of a first curable material having a viscosity of 3,000 to 100,000 cps at 10 to 80° C. and a coating layer (3) coating a surface of the base layer (2) and made of a second curable material having a viscosity of 200 cps or below at 10 to 80° C.

11 Claims, 10 Drawing Sheets

U.S. PATENT DOCUMENTS

| | | | |
|---|---|---|---|
| 6,537,645 B1 | 3/2003 | Yokoyama et al. | |
| 6,771,022 B1 * | 8/2004 | Lee | 313/582 |
| 6,843,952 B1 | 1/2005 | Yokoyama | |
| 2002/0007000 A1 * | 1/2002 | Yokoyama et al. | 524/494 |

FOREIGN PATENT DOCUMENTS

| | | |
|---|---|---|
| WO | WO 99/60446 | 11/1999 |
| WO | WO 01/52299 | 7/2001 |
| WO | WO 2004/062870 | 7/2004 |

\* cited by examiner

FLEXIBLE MOLD AND METHOD OF MANUFACTURING MICROSTRUCTURE USING THE SAME

FIELD OF THE INVENTION

This invention relates to a molding technology. More particularly, this invention relates to a flexible mold and to a manufacturing method of a micro-structure using the flexible mold. The manufacturing method of a microstructure according to the invention is advantageous for manufacturing a rib of a back plate of a plasma display panel, for example.

BACKGROUND

Display devices of a cathode ray tube (CRT) have economically been mass-produced owing to the progress and development of television technologies achieved up to this date, as is well known in the art. In recent years, however, a thin and lightweight flat panel display has drawn an increasing attention as a display device of a next generation that will replace the display devices of the CRT.

One of the typical examples of such flat panel displays is a liquid crystal display (LCD), and the LCD has already been used as a compact display device of notebook type personal computers, cellular telephone sets, personal digital assistants (PDA) and other mobile electronic information devices. On the other hand, a plasma display panel (PDP) is a typical example of thin and large-scale flat panel displays. This plasma display panel has practically been used as wall-hung television receivers for business or home use.

A typical PDP includes a large number of small discharge display cells. In general, each discharge display cell is encompassed and defined with a pair of glass substrates opposing each other in a spaced-apart relation and a rib of a microstructure having a predetermined shape and interposed between these glass substrates. Electrodes are arranged in a spaced-apart relation on the inner surfaces of the glass substrate and are patterned. A rare gas is filled into each discharge display cell so that desired self-light emission can be effected by plasma discharge between the electrodes. Therefore, the PDP is substantially free from field-of-view angle dependence.

The rib described above is generally formed of a ceramic microstructure, is arranged in advance on the back of the glass substrate and constitutes a part of the PDP back plate. In this instance, the PDP back plate mostly has the ribs having the shapes broadly classified into the following two types. One of them is a shape called "straight pattern", and is described in International Publication Gazette No. 00/39829, for example. This straight pattern is simple and can relatively easily manufacture PDP having a large scale.

As described in International Publication Gazette No. 00/39829, a flexible resin mold can be used to mold the rib having the straight pattern. The resin mold is manufactured in the following way. First, a photosensitive resin is filled into a metal master mold having a pattern and a shape corresponding to those of the resin mold, that is, into the metal master mold having the same pattern and the same shape as those of the rib to be manufactured. Next, this photosensitive resin is covered with a plastic film and is cured to integrate the photosensitive resin after curing with the film. The film is then released with the photosensitive resin from the metal master mold.

Here, the photosensitive resin has a high viscosity of 500 to 5,000 cps. This is for suppressing shrinkage of the photosensitive resin upon curing. When the photosensitive resin having such a viscosity is used, the photosensitive resin can be filled without entrapping air bubbles between the metal master mold and the film.

Another rib has a shape called "lattice pattern". The lattice pattern can suppress much more the drop of vertical resolution of PDP than the straight pattern. For, ultraviolet rays from the discharge display cell are more difficult to leak outside. When compared with the straight pattern, the lattice pattern can keep light emission efficiency from the display discharge cell at a higher level. Another reason is that a phosphor necessary for color display of the PDP can be applied with a relatively greater area to the discharge display cell.

A mold can be used to manufacture the rib having the lattice pattern, too. For example, Japanese Unexamined Patent Publication (Kokai) No. 11-96903 describes a method that pushes a rib material into a metal master mold by use of a vacuum press molding machine, cools the rib material and then withdraws it from the metal master mold. However, since the size of the vacuum press molding machine is limited, it can manufacture a back plate for PDP having a size of only a few cm, and is not suitable for manufacturing PDP to serve as a large display. Japanese Unexamined Patent Publication (Kokai) No. 9-283017 discloses the use of a cylindrical metal master mold having an opposite pattern to that of a lattice. This metal master mold moves and turns on a substrate through a barrier member and pushes the barrier member to the substrate. In this way, the metal master mold can manufacture the rib having the lattice pattern. Generally, however, the barrier member is by far softer than the metal master mold. In consequence, when the rib is released with the substrate from the metal master mold, the rib is likely to be broken. Breakage of the rib is particularly remarkable in a substrate having the ribs in a direction vertical to the rotating/moving direction of the metal master mold.

If the flexible mold described above can be applied to molding of the rib, breakage of the rib may be avoided. According to the existing molding technology, however, it is difficult to manufacture such a mold. For, as typically shown in FIG. 10(A), when a photosensitive resin 2 having a high viscosity of 500 to 5,000 cps is filled between the mold 5 and the plastic film 1, it is difficult to fill the photosensitive resin 2 without entrapping bubbles 12. When the photosensitive resin 2 is photo-cured while containing the bubbles 12, the bubbles 12 remain as such inside and on the outer surface of the photosensitive resin 2 after curing as shown in FIG. 10(B). Such bubbles 12 result in rib defects when the ribs are manufactured by using the mold. Therefore, it is preferred not to entrap the bubbles as much as possible into the mold.

A photosensitive resin having a high viscosity such as described above can be filled into the metal master mold without entrapping the bubbles if vacuum equipment such as a vacuum press molding machine is employed. As described in Japanese Unexamined Patent Publication (Kokai) No. 11-96903, however, the size of vacuum equipment is generally limited. Therefore, a mold having a side of only a few cm can be manufactured, and this means is not suitable for manufacturing PDP as a large display.

A photosensitive resin having a low viscosity of not higher than 500 cps may be filled into a metal master mold without entrapping the bubbles even when vacuum equipment is not used. On the other hand, it may be difficult to manufacture a mold into a desired shape because of curing shrinkage that cannot be neglected. When the photosensitive resin 3 having a low viscosity is filled between the metal master mold 5 and the plastic film 1 as typically shown in FIG. 11(A), it is easy to fill the resin 3 without entrapping the bubbles. However, when this photosensitive resin 3 is photo-cured, voids 13 develop between the photosensitive resin 2 after curing and the metal master mold 5 due to a large curing shrinkage ratio of the resin, inviting thereby deformation of the pattern. This pattern deformation is remarkable particularly when a metal master mold generally having a high aspect ratio of projections corresponding to the ribs is used to manufacture a mold such as a rib mold for PDP. Therefore, the mold manufactured by using a photosensitive resin having a low viscosity is not expected to form relatively easily high-quality ribs of the lattice pattern over a broad range on the PDP back plate.

SUMMARY OF THE INVENTION

To solve the problems of the technologies described above, it is an object of the invention to provide a flexible mold that is useful for manufacturing a high-quality PDP rib of a lattice pattern or other microstructures and can highly precisely manufacture the desired product without occurrence of bubbles, pattern deformation, and so forth.

It is another object of the invention to provide a manufacturing method of a microstructure such as a ceramic microstructure by using such a flexible mold.

These and other objects of the invention will be more easily understood from the following detailed description.

According to one aspect of the invention, there is provided a flexible mold having a groove pattern having a predetermined shape and a predetermined size on a surface thereof, comprising a base layer made of a first curable material having a viscosity of 3,000 to 100,000 cps at 10 to 80° C., and a coating layer made of a second curable material having a viscosity of not greater than 200 cps at 10 to 80° C., and coating a surface of the base layer.

According to another aspect of the invention, there is provided a method of manufacturing a microstructure having a projection pattern having a predetermined shape and a predetermined size on a surface of a substrate, comprising the steps of preparing a flexible mold having a groove pattern having a shape and a size corresponding to those of the projection pattern on a surface thereof, and including a base layer made of a first curable material having a viscosity of 3,000 to 100,000 cps at 10 to 80° C., and a coating layer made of a second curable material having a viscosity of not greater than 200 cps at 10 to 80° C., and coating a surface of the base layer; arranging a curable molding material between the substrate and the coating layer of the mold and filling the molding material into the groove pattern of the mold; curing the molding material and forming a microstructure having the substrate and the projection pattern integrally bonded to the substrate; and releasing the microstructure from the mold.

DETAILED DESCRIPTION

Figure 1:
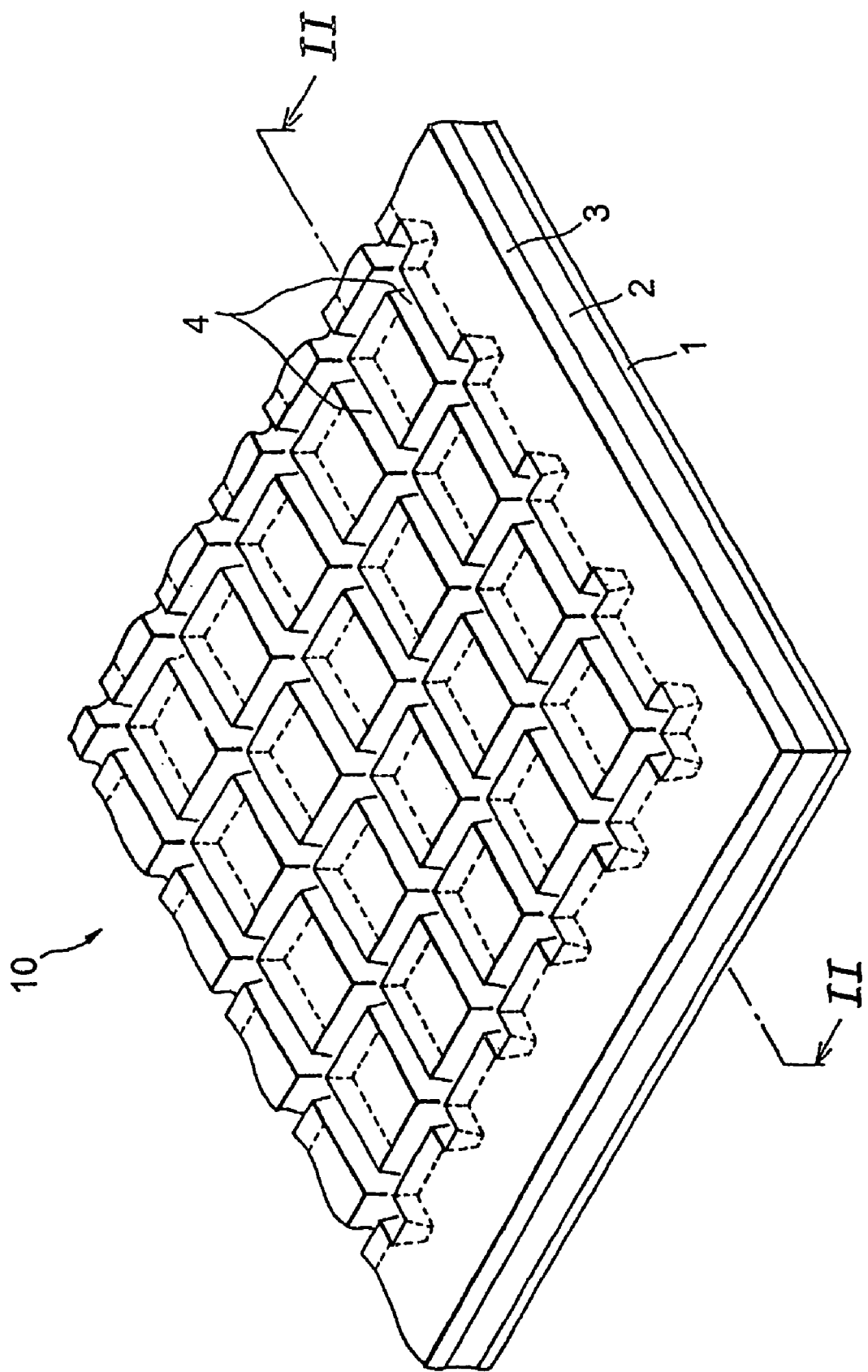
FIG. 1 is a perspective view showing a flexible mold according to an embodiment of the invention.

This invention relates to a flexible mold and to a manufacturing method of a microstructure using the flexible mold. Preferred embodiments of these inventions will be explained with reference to the accompanying drawings. As will be appreciated by those skilled in the art, however, the invention is not particularly limited to the following embodiments. Incidentally, the same reference numeral will be used in the drawings to identify the same or corresponding portion.

Figure 2:
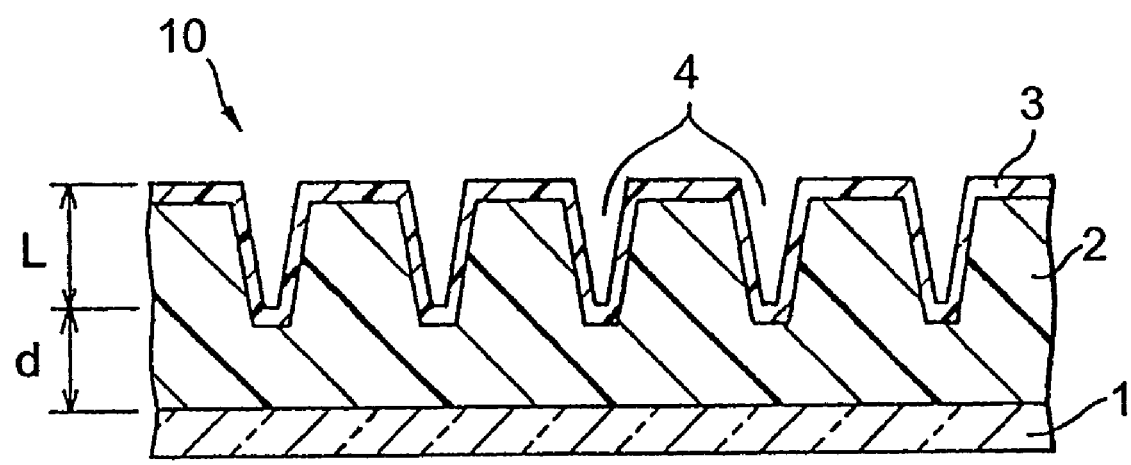
FIG. 2 is a sectional view taken along a line II-II of FIG. 1.

FIG. 1 is a partial perspective view that shows a flexible mold according to an embodiment of the invention, and FIG. 2 is a sectional view taken along a line II-II of FIG. 1.

As shown in these drawings, a flexible mold 10 has a groove pattern having a predetermined shape and a predetermined size on its surface. The groove pattern is a lattice pattern defined by a plurality of groove portions 4 that are arranged substantially parallel to one another while crossing one another and keeping predetermined gaps. Since the flexible mold 10 has the groove portions of the lattice pattern opening on the surface, it can be advantageously used for forming a PDP rib having a lattice projection pattern, for example, though it can be suitably applied to the manufacture of other microstructures. The flexible mold 10 may include an additional layer, whenever necessary, or an arbitrary treatment may be applied to each layer that constitutes the mold. However, the flexible mold 10 fundamentally includes a base layer 2 and a coating layer 3 as shown in FIG. 2.

The base layer 2 of the flexible mold 10 is substantially uniformly made of a first curable material having a relatively high viscosity of 3,000 to 100,000 cps when measured at a temperature of 10 to 80° C., but remains substantially free of bubbles. Generally, such a first curable material does not undergo substantial shrinkage when cured. Therefore, the mold having the grooves made of such a first curable material does not easily undergo deformation but has excellent dimensional stability.

The first curable material is a heat-curable material or a photo-curable material. Particularly when the first curable material is the photo-curable material, the flexible mold can be manufactured within a relatively short time without calling for an elongated heating furnace. A photo-curable material useful for the first curable material mainly contains an oligomer (curable oligomer) due to easy availability. Particularly when the oligomer is an acrylic oligomer such as a urethane acrylate oligomer and/or an epoxy acrylate oligomer, the base layer is optically transparent. Therefore, when this base layer is combined with a transparent coating layer as will be described later, the flexible mold can use a photo-curable molding material. The molding material can be irradiated through the flexible mold.

The coating layer 3 is disposed on the surface of the base layer 2 in close adhesion with the base layer 2. In this instance, bubbles are excluded between the base layer 2 and the coating layer 3 on the former. The coating layer 3 is substantially uniformly formed of a second curable material having a relatively low viscosity of not higher than 200 cps when measured at 10 to 80° C., and is substantially free of air bubbles. This second curable material preferably has low tackiness. Because the coating layer 3 has low tackiness, tackiness on the surface of the flexible mold becomes low. Therefore, handling property can be improved, and adhesion of the forming mold to the substrate and the production apparatus can be prevented.

The second curable material may be either a heat-curable material or a photo-curable material in the same way as the first curable material. Unlike the first curable material, however, the photo-curable material useful for the second curable material includes a monomer (curable monomer). Particularly when the monomer is an acrylic monomer such as acrylamide, acrylonitrile, acrylic acid, acrylic acid ester, and so forth, the coating layer becomes optically transparent. Therefore, the flexible mold can use the photo-curable molding material in combination with the transparent base layer as described above.

Turning back again to FIG. 2, in the flexible mold 10 according to the invention, the distance (d) from the bottom of each groove portion 4 to the back of the base layer 2 is preferably at least $1/10$ of the depth (L) of the groove portion 4. When such a dimensional structure is employed, the formation of the groove portion solely depends on the base layer, so that deformation of the mold 10 and the groove portions 4 becomes difficult to occur. When the distance (d) is smaller than $1/10$ of the depth (L) of the groove portion 4, on the contrary, the groove portion 4 is likely to be formed substantially by the coating layer 3 alone as will be explained later with reference to FIG. 6. In this case, curing shrinkage becomes great and deformation is likely to occur.

Preferably, the base layer 2 further includes a support layer on its back. The support layer can be formed of various materials that can support the mold without its deformation. A support film is one of its examples, though it is in no way restrictive. The support film can be advantageously used for forming the base layer as will be described later.

The support film can be used at a variety of thickness. In view of mechanical strength and handling property, however, the film thickness is generally from 50 to 500 μm and preferably 100 to 400 μm. Preferably, the support film is optically transparent. When the support film is optically transparent, the rays of light irradiated for curing can transmit through this film. Therefore, it is possible to form the base layer and the coating layer by respectively using the photo-curable first and second curing materials. Particularly when the support film is uniformly formed of a transparent material, a uniform base layer and a uniform coating layer can be formed more effectively. Typical examples of the transparent support film are polyethylene terephthalate (PET), polyethylene naphthalate (PEN) and polycarbonate from the aspect of easy availability. A preferred PET support film contains moisture to almost maximum it can absorb under the environment where the flexible mold is used, and has a predetermined size. Therefore, this support film can keep the shape of the groove portion during the use of the flexible mold, and can restrict variance of the size and shape of the moldings.

The flexible mold according to the invention can be manufactured by various means. When the photo-curable first and second curable materials are used, for example, the flexible mold can be advantageously manufactured in the sequence shown in FIGS. 3 and 4.

Figure 3A:
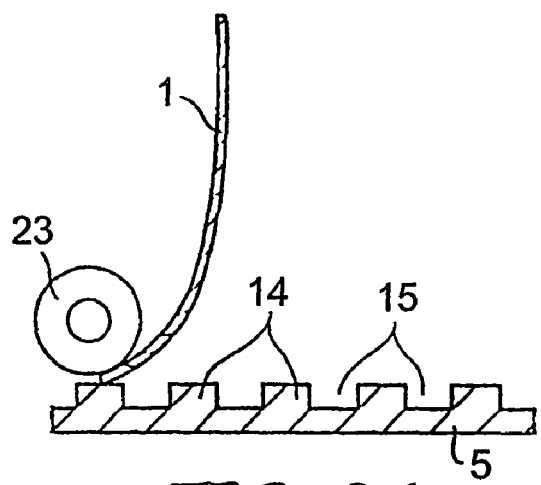
FIG. 3 is a sectional view serially showing a manufacturing method (former half steps) of a flexible mold according to the invention.

First, a metal master mold 5 having a shape and a size corresponding to those of a flexible mold as the object of manufacture, a transparent support film 1 and a laminate roll 23 are prepared as shown in FIG. 3(A). Here, since the flexible mold is used for manufacturing the PDP back plate, in particular, the metal master mold 5 has partitions having the same pattern and the same shape as those of the ribs of the PDP back plate on its surface. Therefore, the space (recess) 15 defined by the adjacent partitions 14 is the portion that is to become a discharge display cell of PDP. The laminate roll 23 is means for pressing the support film 1 to the metal master mold 5, and known and customary laminate means may be used in place of the laminate roll 23, whenever necessary.

Figure 3B:
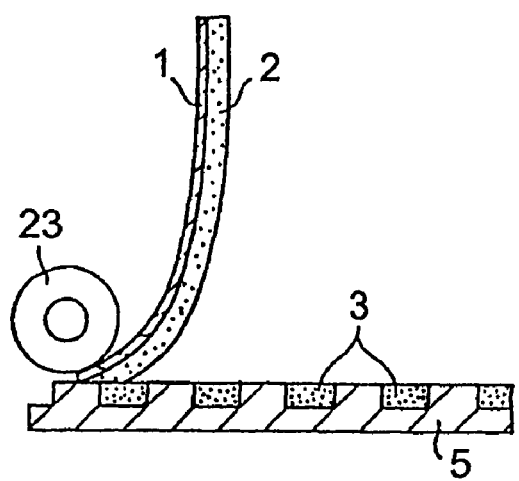

Next, known and customary coating means (not shown) such as a knife coater or a bar coater is used to apply the photo-curable first curable material 2 to one of the surfaces of the support film 1 to a predetermined thickness as shown in FIG. 3(B). The photo-curable second curable material 3 is applied to the partition-holding surface of the metal master mold 5 to a predetermined thickness by the same method, and is filled into the recess 15 defined in the gap between the partitions 14. In this invention, the second curable material 3 is easy to fluidize due to its low viscosity. Therefore, even when the metal master mold 5 has the partitions 14 having a high aspect ratio, the second curable material 3 can be uniformly filled without entrapping bubbles.

Figure 3C:
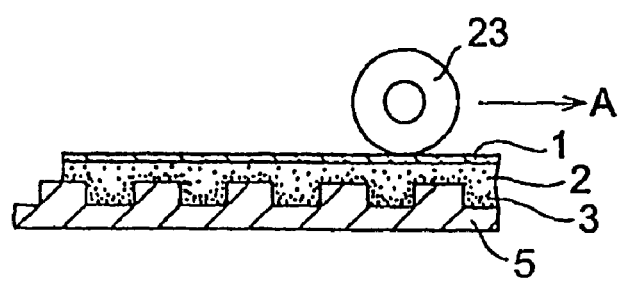

Next, the laminate roll 23 is caused to slide on the metal master mold 5 in a direction indicated by arrow A in FIG. 3(C), while the first curable material 2 and the second curable material 3 keep adhesion with each other. As a result of this laminate treatment, the second curable material 3 can be substantially removed from the recess 15.

Figure 5:
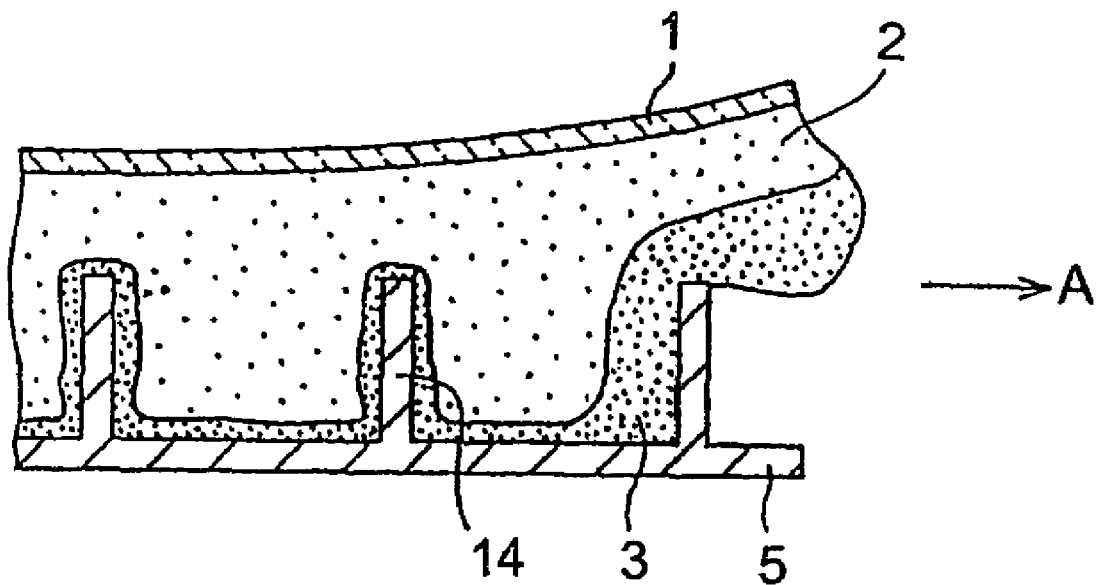
FIG. 5 is a sectional view showing distribution of first and second curable materials during a manufacturing process of a flexible mold according to the invention.

It is preferred during this laminate treatment to bring both curable materials into adhesion while the distance from the top (free end) of the partitions 14 to the support film 1 is kept sufficiently greater than the height of the partitions (for example, at least $1/10$ of the height of the partitions). For, it is possible to effectively exclude most of the second curable material 3 from the space of the partitions 14 and to replace it by the first curable material 2 as shown in FIG. 5. As a result, the base layer 2 can be used for forming the groove pattern of the mold besides the coating layer 3.

Figure 6:
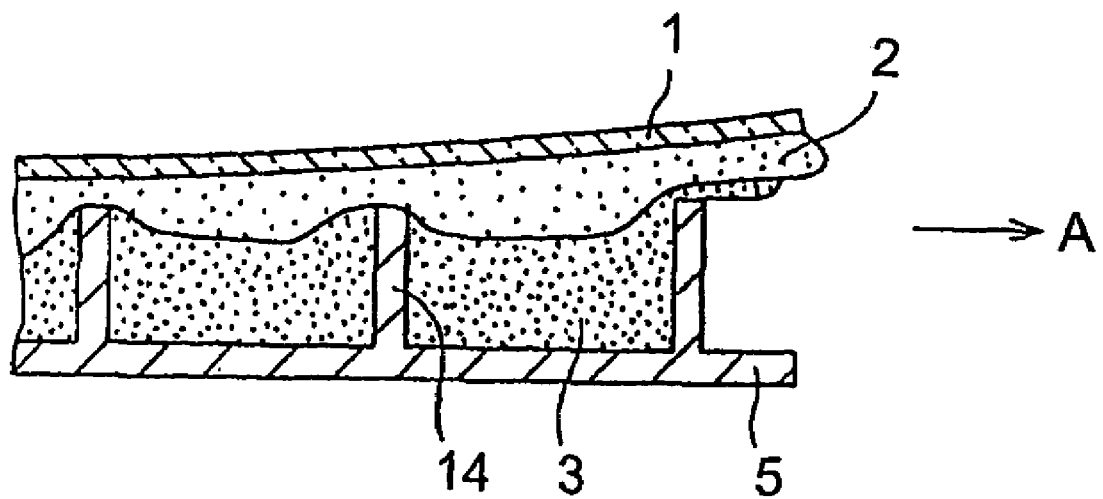
FIG. 6 is a sectional view showing distribution of the first and second curable materials during a manufacturing process of the flexible mold according to the invention.

When the distance from the top (free end) of the partition 14 to the support film 1 is sufficiently smaller than the height of the partition (such as smaller than $1/10$ of the height of the partition) as shown in FIG. 6, on the contrary, the second curable material 3 can hardly be excluded from the space of the partitions 14 and cannot be replaced by the first curable material 2. Therefore, the groove pattern of the mold consists almost fully of the coating layer 3.

Figure 4D:
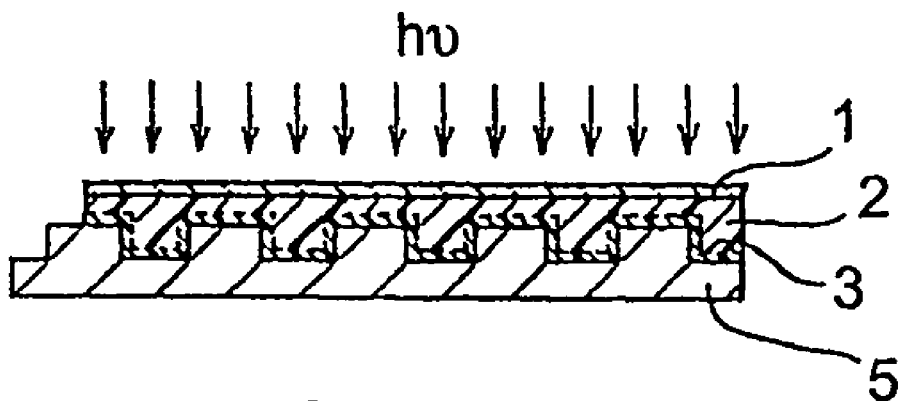
FIG. 4 is a sectional view serially showing a manufacturing method (latter half steps) of a flexible mold according to the invention.

After the laminate treatment is completed, the first and second curable materials 2 and 3 are irradiated by light (hv) through the support film 1 while the support film 1 is laminated on the metal master mold 5 as shown in FIG. 4(D). If the support film 1 does not contain light scattering elements such as the bubbles but is uniformly formed of the transparent material, the rays of light irradiated hardly attenuate and can uniformly reach the first and second curable materials 2 and 3. As a result, the first curable material is efficiently cured to give the uniform base layer 2 that is bonded to the support film 1. The second curing material, too, is similarly cured to give the uniform coating layer 3 bonded to the base layer 2.

Figure 4E:
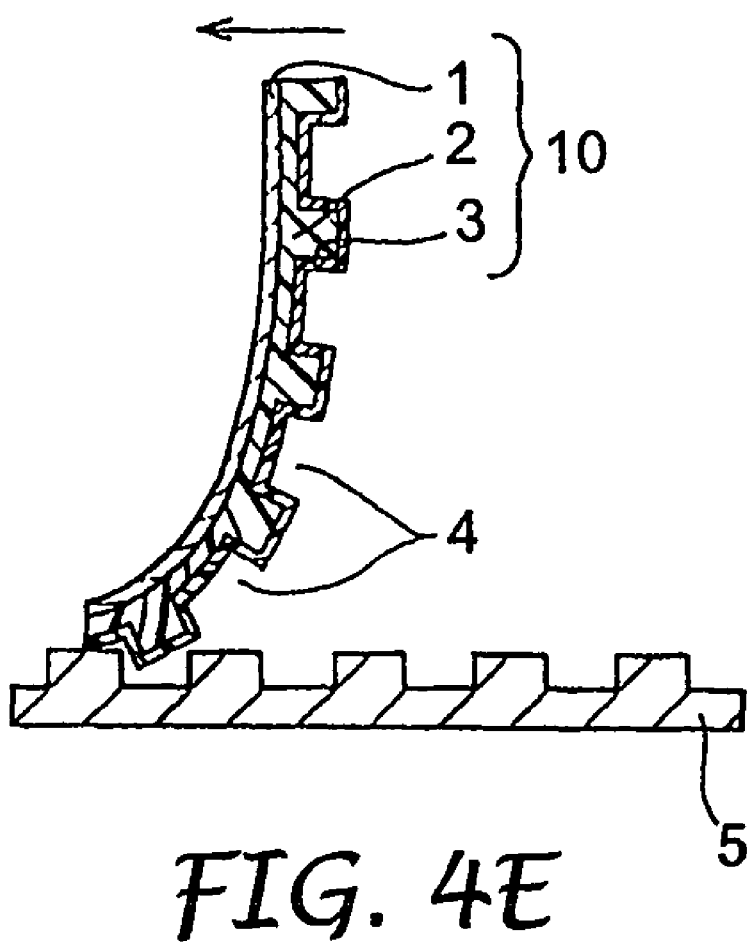

After a series of manufacturing steps described above, there is obtained a flexible mold including the support film 1, the base layer 2 and the coating layer 3 that are integrally bonded to one another. Thereafter, the flexible mold 10 is released from the metal master mold 5 while keeping its integrity as shown in FIG. 4(E).

This flexible mold can be manufactured relatively easily irrespective of its size in accordance with known and customary laminate means and coating means. Therefore, unlike the conventional manufacturing method using vacuum equipment such as a vacuum press machine, this invention can easily manufacture a large flexible mold without any limitation.

Furthermore, the flexible mold according to the invention is useful for manufacturing various microstructures. As disclosed in Japanese Unexamined Patent Publication (Kokai) No. 2001-191345, for example, the mold according to the invention is particularly and extremely useful for molding a rib (microstructure) of PDP having a lattice pattern. When this flexible mold is employed, it becomes possible to easily manufacture a large screen PDP having lattice ribs, in which ultraviolet rays do not easily leak from discharge display cells, by merely using a laminate roll in place of vacuum equipment and/or a complicated process.

Next, a method of manufacturing a PDP substrate having ribs on a flat glass sheet by using the manufacturing equipment shown in FIGS. 1 to 3 will be explained with reference to FIGS. 7 and 8.

Figure 7A:
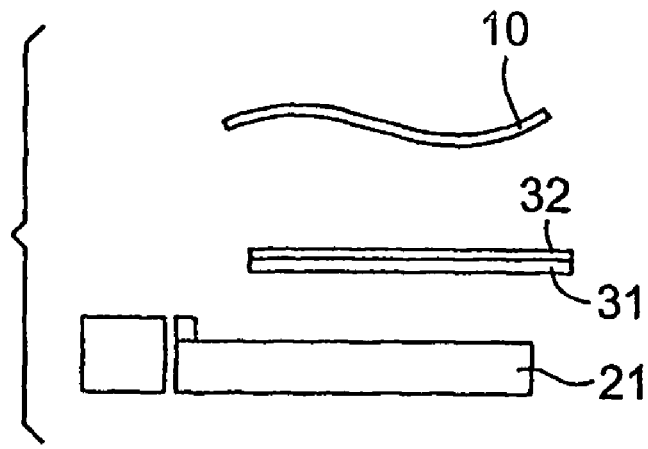
FIG. 7 is a sectional view serially showing a manufacturing method (former half steps) of a PDP back plate according to the invention.

First, as shown in FIG. 7(A), a flat glass sheet 31 is prepared in advance having parallel electrodes 32 with predetermined gaps, and is then arranged on a support table 21. If a stage, not shown, capable of displacement is used, the support table 21 supporting the flat glass sheet 31 thereon is put at a predetermined position of the stage.

Next, the flexible mold 10 having the groove pattern on its surface according to the invention is set to a predetermined position of the flat glass sheet 31.

Figure 7B:
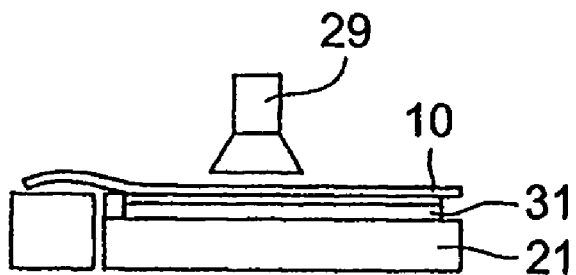

The flat glass sheet 31 and the mold 10 are positioned relative to each other. In detail, this positioning is made with eye or, as shown in FIG. 7(B), by use of a sensor 29 such as a CCD camera in such a fashion that the groove portion of the mold 10 and the electrodes of the flat glass sheet 31 are parallel. At this time, the groove portion of the mold 10 and the space between the adjacent electrodes on the flat glass sheet 31 may be brought into conformity by adjusting the temperature and humidity, whenever necessary. Generally, the mold 10 and the flat glass sheet 31 undergo extension and contraction in accordance with the change of the temperature and humidity, and control is so made as to keep constant the temperature and humidity when positioning between the flat glass sheet 31 and the mold 10 is completed. Such a control method is particularly effective for the manufacture of a large-area PDP substrate.

Figure 7C:
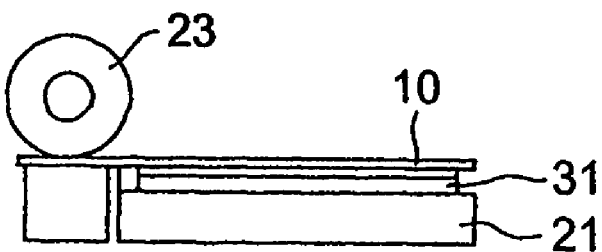

Subsequently, the laminate roll 23 is set to one of the end portions of the mold 10 as shown in FIG. 7(C). One of the end portions of the mold 10 is preferably fixed at this time onto the flat glass sheet 31. In this way, deviation of positioning between the flat glass sheet 31 and the mold 10 previously positioned can be prevented.

Figure 7D:
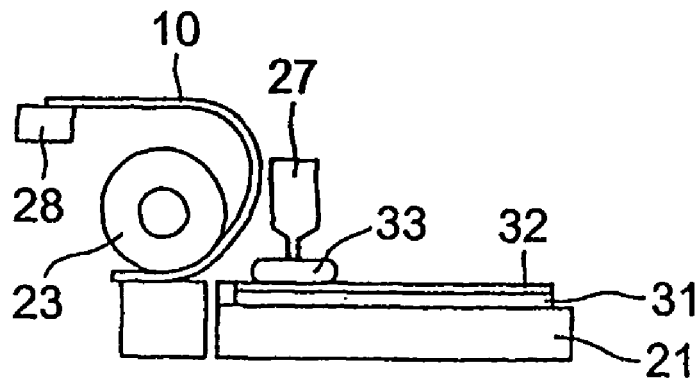

Next, as shown in FIG. 7(D), the other free end portion of the mold 10 is lifted up and moved with a holder 28 above the laminate roll 23 to expose the flat glass sheet 31. Caution is to be paid at this time not to impart any tension to the mold 10 so as to prevent crease of the mold 10 and to keep positioning between the mold 10 and the flat glass sheet 31. Other means may also be employed so long as positioning can be kept. A predetermined amount of a rib precursor 33 necessary for forming the rib is supplied onto the flat glass sheet 31. The example shown in the drawing uses a paste hopper 27 having a nozzle as a rib precursor feeder.

Here, the term "rib precursor" means an arbitrary molding material capable of forming the rib molding as the final object, and does not particularly limit the materials so long as they can form the rib molding. The rib precursor may be of a heat-curing type or a photo-curing type. As will be explained below with reference to FIG. 8(F), the photo-curing rib precursor, in particular, can be used extremely effectively in combination with the transparent flexible mold described above. The flexible mold hardly has defects such as bubbles and deformation and can suppress non-uniform scattering of light. In consequence, the molding material is uniformly cured and provides a rib having constant and excellent quality.

An example of compositions suitable for the rib precursor basically contains (1) a ceramic component giving the rib shape, such as aluminum oxide, (2) a glass component filling gaps between the ceramic components and imparting compactness to the rib, such as lead glass or phosphate glass and (3) a binder component for storing, holding and bonding the ceramic component and the glass component, and a curing agent or a polymerization initiator for the binder component. Preferably, curing of the binder component does not rely on heating but uses irradiation of light. In such a case, heat deformation of the flat glass sheet need not be taken into consideration. An oxidation catalyst consisting of oxides, salts or complexes of chromium (Cr), manganese (Mn), iron (Fe), cobalt (Co), nickel (Ni), copper (Cu), zinc (Zn), indium (In) or tin (Sn), ruthenium (Ru), rhodium (Rh), palladium (Pd), silver (Ag), iridium (Ir), platinum (Pt), gold (Au) or cerium (Ce) is added to this composition, whenever necessary, so as to lower a removal temperature of the binder component.

In the practice of the manufacturing method shown in the drawings, the rib precursor 33 is not uniformly supplied to the entire part of the flat glass sheet 31. In other words, the rib precursor 33 may be supplied to only the flat glass sheet 31 in the proximity of the laminate roll 23 as shown in FIG. 7(D). This is because the rib precursor 33 can be uniformly spread when the laminate roll 23 moves on the mold 10 in the subsequent step. However, the rib precursor 33 preferably has a viscosity of about 100,000 cps or below, more preferably about 20,000 cps or below, in this case. When the viscosity of the rib precursor is higher than about 100,000 cps, the laminate roll does not sufficiently spread the rib precursor, so that air is entrapped into the groove portions of the mold and results in the rib defects. As a matter of fact, when the viscosity of the rib precursor is about 100,000 cps or below, the rib precursor uniformly spreads between the flat glass sheet and the mold only when the laminate roll is moved once from one of the end portions of the flat glass sheet to the other end, and the rib precursor can be uniformly filled into all the groove portions without entrapping bubbles. However, the supplying method of the rib precursor is not limited to the method described above. For example, the rib precursor may be coated to the entire surface of the flat glass sheet, though this method is not shown in the drawings. At this time, the rib precursor for coating has the same viscosity as the viscosity described above. Particularly when the rib of the lattice pattern is formed, the viscosity is 20,000 cps or below, preferably about 5,000 cps or below.

Figure 8E:
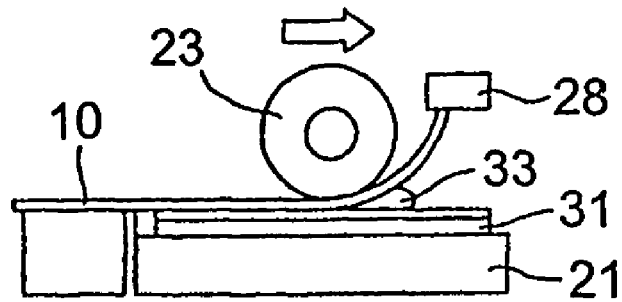
FIG. 8 is a sectional view serially showing a manufacturing method (latter half steps) of the PDP back plate according to the invention.
Figure 8F:
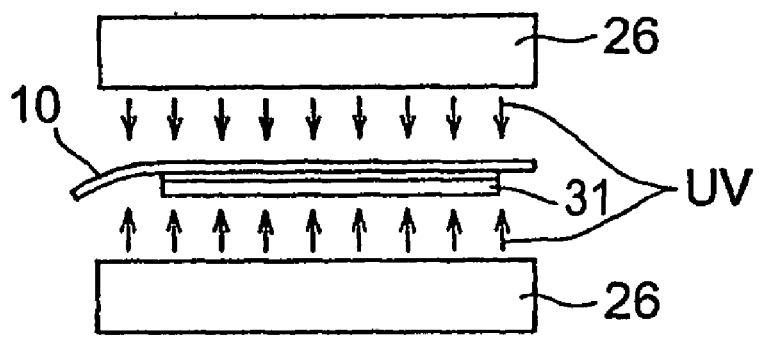
Figure 8G:
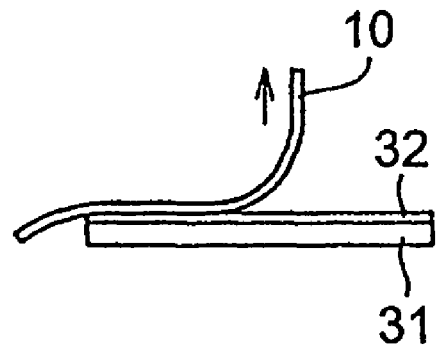

Next, a rotating motor (not shown) is driven to move the laminate roll 23 on the mold 10 at a predetermined speed as indicated by arrow in FIG. 8(E). While the laminate roll 23 moves on the mold 10 in this way, the pressure is serially applied to the mold 10 from one of its ends to the other due to the self-weight of the laminate roll 23. Consequently, the rib precursor 33 spreads between the flat glass sheet 31 and the mold 10, and the molding material is filled into the groove portions of the mold 10. In other words, the rib precursor 33 of the groove portions serially replaces air and is filled. The thickness of the precursor at this time can be adjusted to a range of several microns to dozens of microns when the viscosity of the rib precursor or the diameter, weight or moving speed of the laminate roll is controlled appropriately.

According to the manufacturing method of the invention, even when the groove portions of the mold serve as channels of air and collect air, they can efficiently discharge air outside or to the periphery of the mold when they receive the pressure described above. As a result, the manufacturing method of the invention can prevent residual bubbles even when filling of the rib precursor is carried out at the atmospheric pressure. In other words, vacuum need not be applied to fill the rib precursor. Needless to say, the bubbles may be removed more easily in vacuum.

Subsequently, the rib precursor is cured. When the rib precursor 33 spread on the flat glass sheet 31 is of the photocuring type, the rib precursor (not shown) is placed with the flat glass sheet 31 and the mold 10 into a light irradiation apparatus 26 as shown particularly in FIG. 8(F), and the rays of light such as ultraviolet rays (UV) are irradiated to the rib precursor through the flat glass sheet 31 and/or the mold 10 to cure the rib precursor. In this way, the molding of the rib precursor, that is, the rib itself, can be acquired.

Finally, the resulting rib as bonded to the flat glass sheet 31, the flat glass sheet 31 and the mold 10 are withdrawn from the light irradiation apparatus, and the mold 10 is then peeled and removed. Since the mold according to the invention has high handling property, the mold can be easily peeled and removed without breaking the rib bonded to the flat glass sheet.

Though the invention has thus been explained with reference to one preferred embodiment thereof, the invention is not particularly limited thereto.

The flexible mold is not particularly limited to the form described above so long as it can accomplish the objects and the operation and effect of the invention. For example, the flexible mold may have a so-called "straight groove pattern" formed by arranging a plurality of groove portions substantially in parallel with one another with gaps among them without crossing one another. Such a flexible mold can be used for forming a rib of PDP of a straight pattern.

The flexible mold according to the invention is not solely used for forming the PDP rib but can be advantageously used for forming a variety of microstructures having similar shapes or patterns.

EXAMPLES

The invention will be more concretely explained with several examples thereof. However, the invention is not limited to the following examples as will be appreciated by those skilled in the art.

Example 1

Figure 9:
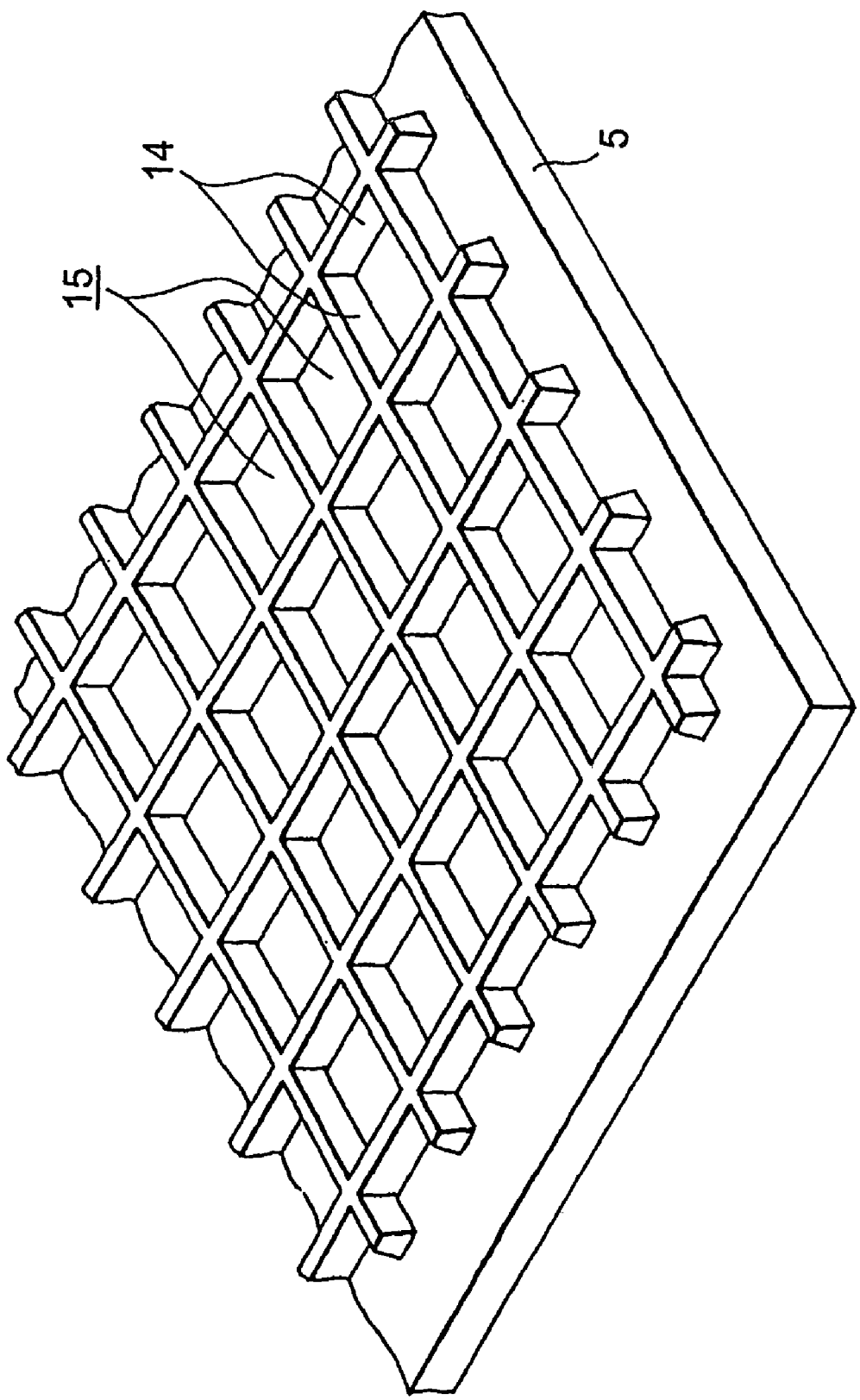
FIG. 9 is a perspective view showing appearance of the PDP back plate manufactured in the embodiment.
Figure 10A:
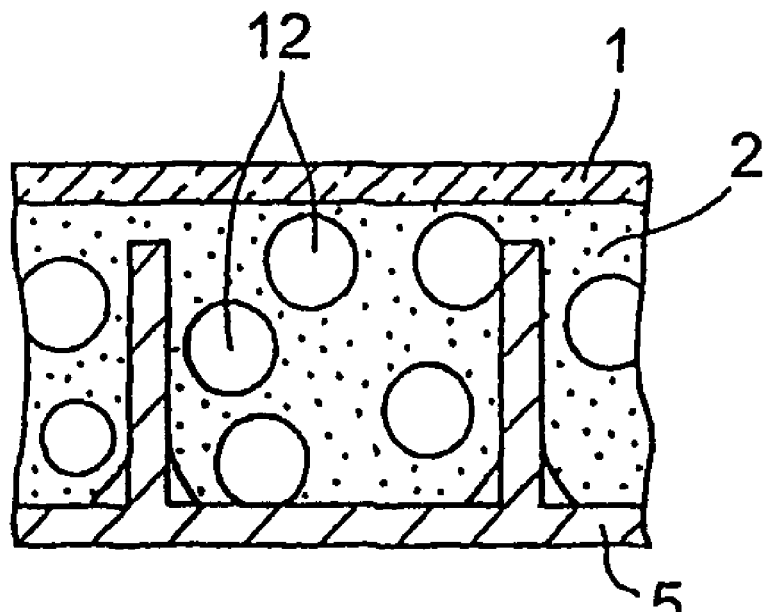
FIG. 10 is a sectional view showing one problem of a conventional manufacturing method of a flexible mold.
Figure 10B:
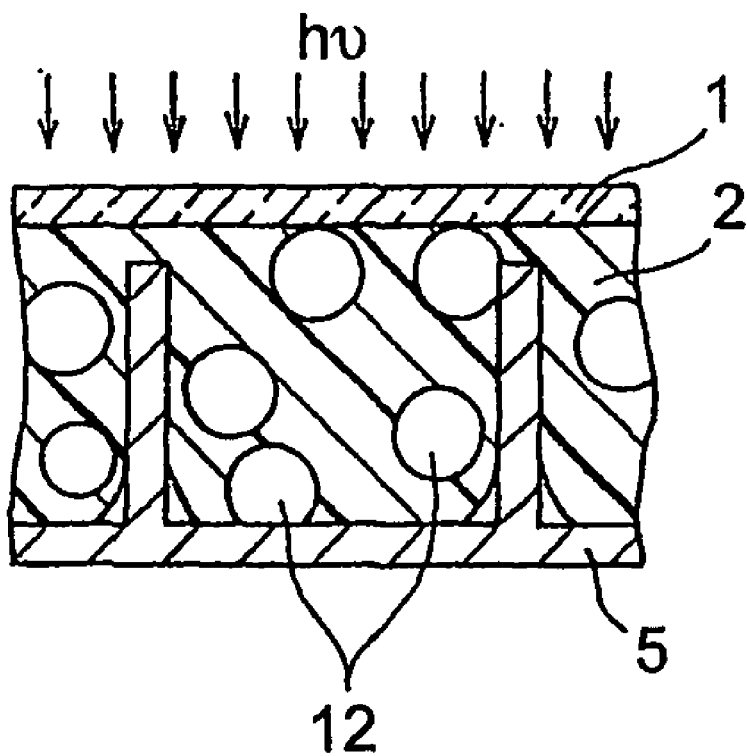
Figure 11A:
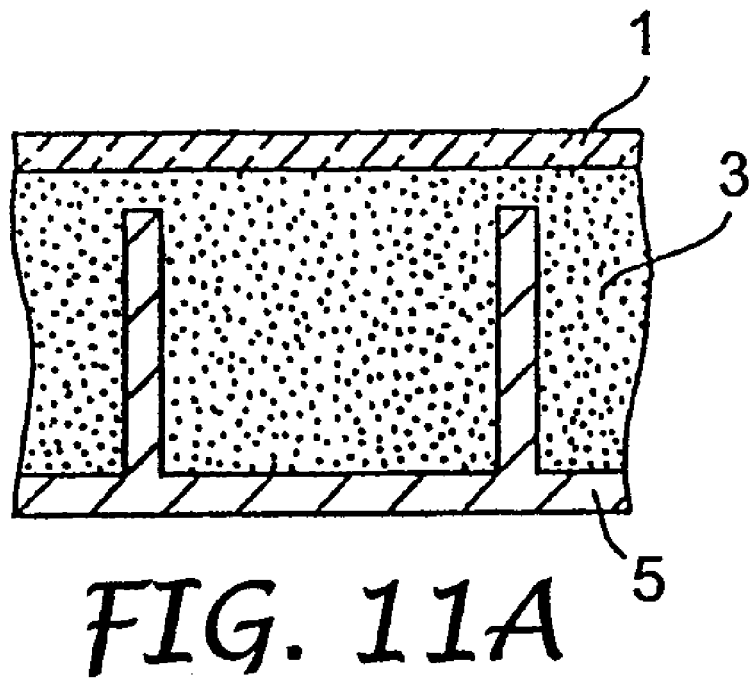
FIG. 11 is a sectional view showing another problem of a conventional manufacturing method of the flexible mold.
Figure 11B:
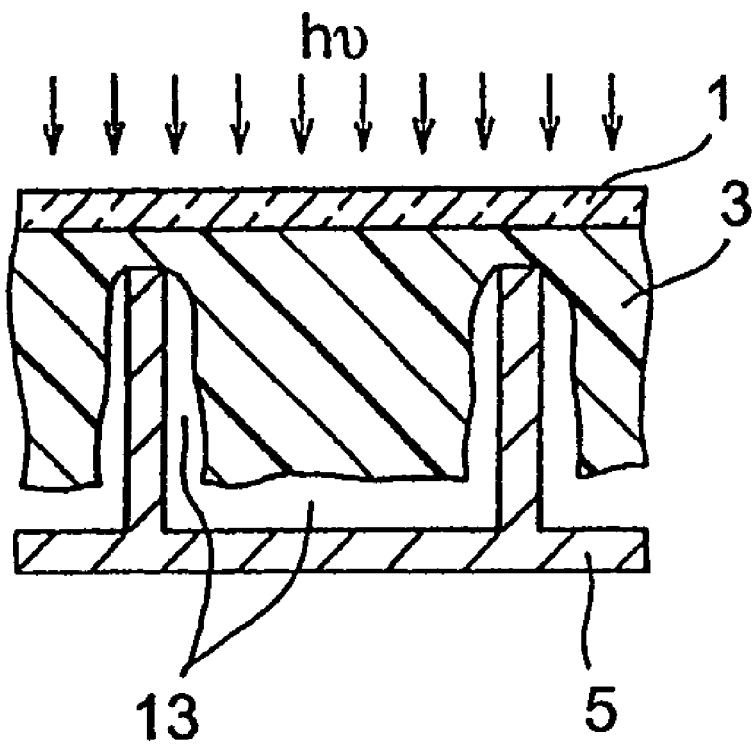

To manufacture a PDP back plate, this example prepares a rectangular metal master mold 5 having partitions 14 of a lattice pattern as typically shown in FIG. 9. The explanation will be given in further detail. This metal master mold 5 is constituted by arranging longitudinal partitions (longitudinal ribs) having an isosceles trapezoidal section in a predetermined pitch in a longitudinal direction and transverse partitions (transverse ribs) having an isosceles trapezoidal section in a predetermined pitch in a direction perpendicular to the longitudinal ribs as tabulated in the following Table 1. The spaces (recess) 15 defined by the partitions 14 in the longitudinal and transverse directions are discharge display cells of PDP.

TABLE 1

| | pitch | height | top width | bottom width | taper angle |
|---|---|---|---|---|---|
| longi. rib | 300 μm | 208 μm | 55 μm | 115 μm | 82° |
| trans. rib | 500 μm | 208 μm | 37 μm | 160 μm | 75° |

A first curable material is prepared by mixing 80 wt % of aliphatic urethane acrylate oligomer (a product of Henkel Co., trade name "Photomer 6010"), 20 wt % of 1,6-hexanediol diacrylate (a product of Shin-Nakamura Kagaku K. K.) and 1 wt % of 2-hydroxy-2-methyl-1-phenyl-propane-1-on (a product of Ciba Specialties Co., trade name "Darocure 1173"). When the viscosity of this first curable material is measured, it is 8,500 cps at 22° C. A Brookfield viscometer (B type viscometer) is used to measure the viscosity of the first curable material. The measurement mode uses a spindle #5 at a number of revolution of 20 rpm.

Further, 40 wt % of Photomer 6010 described above, 60 wt % of 1,6-hexanediol diacrylate and 1 wt % of Darocure 1173 are mixed to prepare a second curable material. When the viscosity of this second curable material is measured in the same way as described above, it is 110 cps at 22° C.

Next, the first curable material prepared in the manner described above is coated to a thickness of 200 μm to a PET support film having a thickness of 188 μm. On the other hand, the second curable material is coated to a surface of a metal mold separately prepared in such a fashion as to fill recesses of the metal mold.

The first curable material on the support film is laminated with the second curable material on the metal master mold by use of a laminate roll in such a fashion that the distance from the upper surface of the top of partitions of the metal master mold to the support film becomes 25 μm.

Rays of light having a wavelength of 300 to 400 nm are irradiated for 30 seconds to the first and second curable materials under this state through the support film from a florescent lamp, a product of Mitsubishi Denki-Oslam K. K. The first and second curable materials are respectively cured, giving a base layer and a coating layer covering the former. Subsequently, the support film is peeled with the base layer and the coating layer from the metal master mold to give a flexible mold.

When the resulting flexible mold is inspected through an optical microscope, existence of bubbles and deformation of the pattern are not confirmed on the mold.

Example 2

A flexible mold is manufactured and inspected in the same way as in Example 1 with the exception that the first curable material on the support film is laminated with the second curable material on the metal mast mold in such a fashion that the distance from the upper surface of the top of the partitions of the metal master mold to the support film is 55 μm.

In the flexible mold of this example, existence of bubbles and deformation of the pattern cannot be confirmed, either.

Example 3

A flexible mold is manufactured and inspected in the same way as in Example 1 with the exception that the second curable material having a viscosity of 200 cps at 22° C. is prepared by mixing 50 wt % of Photomer 6010, 50 wt % of 1,6-hexanediol diacrylate and 1 wt % of Darocure 1173.

In the flexible mold of this example, existence of bubbles and deformation of the pattern cannot be confirmed, either.

Example 4

A flexible mold is manufactured and inspected in the same way as in Example 1 with the exception that the second curable material having a viscosity of 18 cps at 22° C. is prepared by mixing 100 wt % of 1,6-hexanediol diacrylate and 1 wt % of Darocure 1173.

In the flexible mold of this example, existence of bubbles and deformation of the pattern cannot be confirmed, either.

Comparative Example 1

A flexible mold is manufactured and inspected in the same way as in Example 1 with the exception that the second curable material is not used, the first curable material is laminated with the metal master mold after it is coated to a thickness of 200 μm to the support film, and the distance from the upper surface of the top of the partitions of the metal master mold to the support film is 25 μm for comparison.

Existence of a large number of bubbles is confirmed in the flexible mold of this comparative example. However, deformation of the pattern cannot be confirmed.

Comparative Example 2

A flexible mold is manufactured and inspected in the same way as in Example 1 with the exception that the first curable material is disposed linearly on one of the end portions of the second curable material coated to the metal master mold, a lamination roll is moved to the other end portion of the metal master mold applied with the second curable material after the lamination roll is arranged at the outer edge portion of the first curable material, and the distance from the upper surface of the top of the partitions of the metal master mold to the support film is 25 μm for comparison.

Existence of bubbles is not confirmed in the flexible mold of this comparative example, but deformation of the pattern is locally confirmed.

As explained above, this invention can provide a flexible mold that is useful for manufacturing a PDP rib having a high quality lattice pattern or other microstructures and can highly precisely manufacture the microstructures without involving defects such as occurrence of bubbles and pattern deformation.

The invention can also provide a flexible mold that is effective for relatively easily manufacturing a PDP rib having a high quality lattice pattern or a variety of other microstructures The invention can further provide a manufacturing method of a PDP rib having a high quality lattice pattern or other microstructures such as a ceramic microstructure.

What is claimed is:

1. A method of making a flexible mold comprising:
   coating a first curable material having a viscosity of 3,000 to 100,000 cps at 10 to 80° C. on a support film wherein the support film is flexible;
   coating a second curable material having a viscosity of not greater than 200 cps at 10 to 80° C. on a master mold filling recesses of the mold;
   laminating the coated support to the coated mold such that the first curable material is between the second curable material and the support film;
   heat curing or photocuring the first and second curable material; and
   releasing the flexible mold from the master mold.

2. The method of claim 1 wherein first curable material is photocurable.

3. The method of claim 2 wherein the first curable material contains a urethane acrylate oligomer, an epoxy acrylate oligomer, or a combination thereof.

4. The method of claim 1 wherein the second curable material is photocurable.

5. The method of claim 4 wherein the second curable material contains an acrylic monomer selected from the group consisting of acrylamide, acrylonitrile, acrylic acid, and acrylic acid ester.

6. The method of claim 1 wherein the first curable material and second curable material are photocurable.

7. The method of claim 6 wherein the support film is optically transparent such that rays of light irradiated for curing can transmit through the support film.

8. The method of claim 7 wherein the first curable material and second curable material are photocured through the support film.

9. The method of claim 1 wherein the support film is selected from the group consisting of polyethylene terephthalate, polyethylene naphthalate, and polycarbonate.

10. The method of claim 1 wherein the support film has a thickness ranging from 50 to 500 μm.

11. The method of claim 1 wherein during laminating the second curable material is replaced by the first curable material.

* * * * *